J. A. CRESSEY.
BAKING DEVICE.
APPLICATION FILED AUG. 4, 1919.
1,335,484.
Patented Mar. 30, 1920.
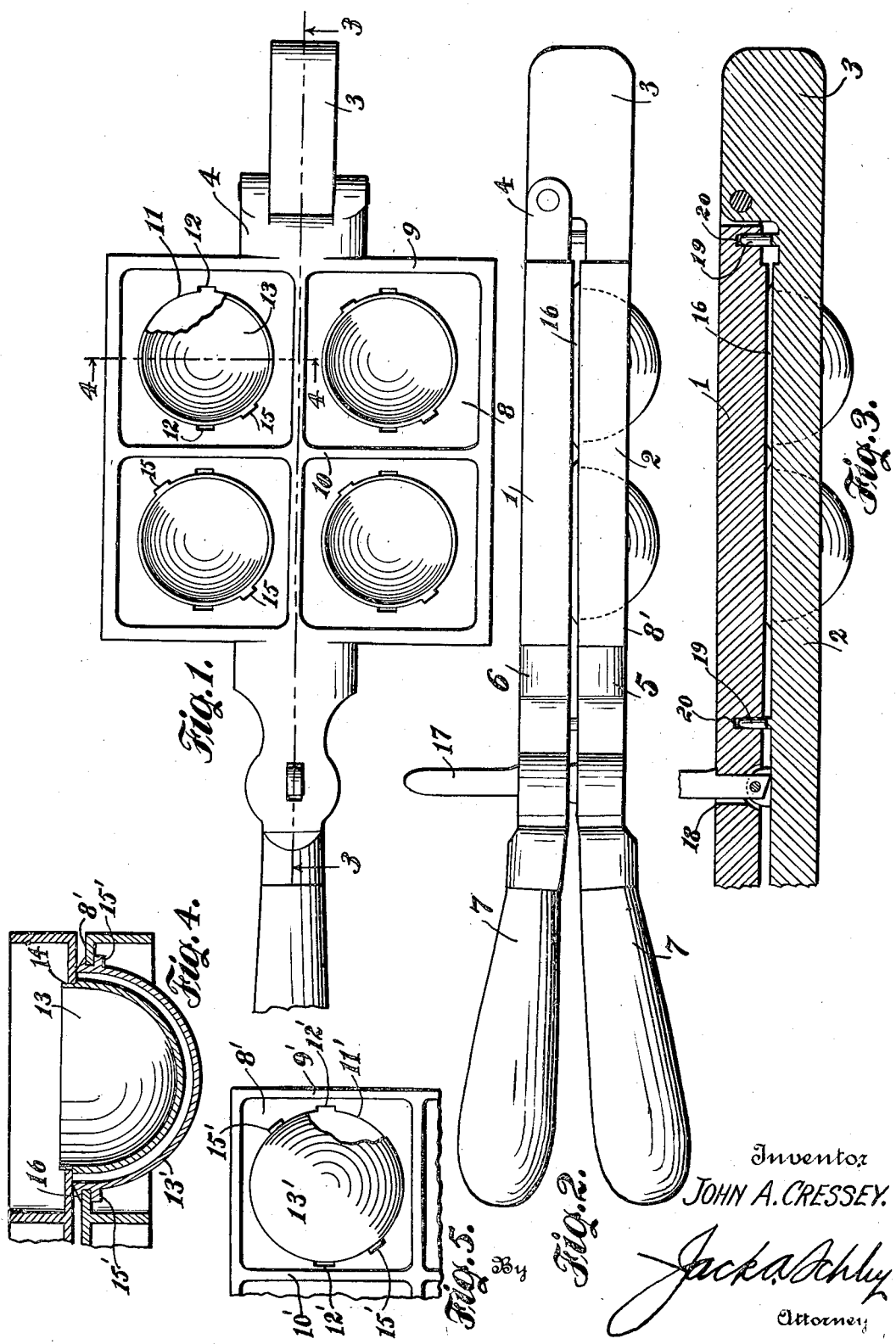

UNITED STATES PATENT OFFICE.

JOHN A. CRESSEY, OF DALLAS, TEXAS.

BAKING DEVICE.

1,335,484.   Specification of Letters Patent.   Patented Mar. 30, 1920.

Application filed August 4, 1919. Serial No. 315,142.

*To all whom it may concern:*

Be it known that I, JOHN A. CRESSEY, a citizen of the United States, residing at Dallas, in the county of Dallas and State of Texas, have invented certain new and useful Improvements in Baking Devices, of which the following is a specification.

This invention relates to new and useful improvements in baking devices.

The purpose of the invention is to mold dough or plastic material into cup-shape form and bake the same efficiently and expeditiously; and by these terms is meant to bake the dough crisp and without air pockets or thin portions.

In carrying out the invention a pair of supports are hinged together and one of these carries a plurality of female molds receiving male molds carried by the other support, the space between the molds, holding the dough for forming the article to be baked. Unless the steam is permitted to escape the article or sections baked will be too thin at the bottom and will have one or more air pockets; therefore I arrange the parts so that the device is not entirely closed until the steam has escaped.

Among the particular mechanical features are the provision of knife-edges for severing the dough around the molds and joints whereby a particular mold may be removed without disturbing the others.

The invention will be more readily understood from a reading of the following specification and by reference to the accompanying drawings, in which an example of the invention is shown and wherein:

Figure 1 is a plan view of a device embodying the invention,

Fig. 2 is a side elevation of the same,

Fig. 3 is a longitudinal sectional view on the line 3—3 of Fig. 1,

Fig. 4 is a cross-sectional detail on the line 4—4 of Fig. 1, and

Fig. 5 is an underside detail of a portion of the device showing one of the mold fastenings.

In the drawings the numeral 1 designates an upper support and 2 a lower support. The support 2 has a boss 3 at one end to which an ear 4 on the upper support is hinged. The lower support has a central shank 5 and the upper support 1, is provided with a shank 6. Handles 7 are fastened to the shanks.

The support 1 has a rectangular plate 8 which is strengthened by marginal flanges 9 and intersecting cross ribs 10. A plurality of openings or sockets 11 are provided in the plate 8 and each has oppositely disposed slots 12.

Male semi-spherical molds 13 have their upper edges 14 shouldered as shown in Fig. 4, the reduced portion being passed up through the socket 11 and the shoulder resting against the under side of the plate. Diametrical opposite lugs 15 on the molds are passed through the slot, so that by giving each mold a slight turn the lugs are carried over the plate and the molds held in place. It will be seen that any mold can be removed by simply turning it so that its lugs 15 will drop through the slots 12.

The lower support 2 has a corresponding plate 8' having flanges 9' and ribs 10', as well as sockets 11' and slots 12'. Female molds 13' are passed downwardly through the sockets 11'. These molds each have an outwardly directed flange 16 which is beveled and reduced to a knife-edge at the juncture of its top surface and the inner wall of the said mold. Each mold has diametrically opposite lugs 15' which are passed down through the slots 12'. The flanges 16 rest on the upper face of the plate 8' and the lugs 15' bear against the under face of the plate, when the molds are turned.

The inner diameter of each female mold 13' is sufficiently greater than the greatest diameter of the corresponding male mold 13, as to provide a cup-shaped or semi-spherical space therebetween and in this space the section of dough is molded and baked. The under face of the upper plate 8 comes into contact with the knife edges of the flanges 16, thereby severing the dough which overflows the molds. A latch 17 pivoted to the shank 5 extends up through a slot 18 in the shank 6 so as to engage over the upper edge of the slot and fasten the plates together. Pilot posts 19 projecting upward from the plate 8' are received in sockets 20 in the upper support for properly centering the molds when the device is closed. When the upper support is swung upward the hinge ear will rest on the boss 3 and so hold the support.

In using the device the upper support is swung upward to open the device and withdraw the male molds 8 from the female molds 8'. A properly mixed batter or dough is placed in the female molds 8' and the upper support lowered so that the molds 8 enter the female molds and spread the batter or dough throughout the spaces therebetween, but the supports are not fastened and a certain amount of dough will overflow and support the plate 8 above the flanges 16.

The device is suitably supported over a fire as the baking proceeds, steam will be generated by the moisture in the batter or dough and this steam will escape between the plates. If the steam did not escape it would displace part of the dough leaving thin places and air pockets. After the steam has escaped, which it will do after a certain period of baking, the supports are pressed together by means of the handles 7 and fastened by the latch and the device turned to subject the support 1 to the fire. When the supports are brought together the knife edges of the flanges sever the dough around the molds; this also seals the space between the molds. The sections are baked crisp, the device opened and the finished sections dumped out. By means of a suitable wrench corresponding molds may be quickly removed without disturbing the other molds and also replaced. One of the advantages of the detachable molds is that they may be made of metal different from the rest of the structure and more suitable for baking.

What I claim, is:

1. In a baking device, upper and lower supports having corresponding ends hinged together, said supports having circular openings provided at their peripheries with radial extensions, female circular molds adapted for insertion in a downwardly direction through the openings in the lower support and provided at their tops with annular flanges to engage the upper surface of the lower support, said flanges being sharpened for providing cutting edges, said molds having radial lugs spaced from the flanges to pass through said radial extensions and engage the lower surface of the lower support, male circular molds having annular shoulders spaced from their upper ends for providing reduced portions for insertion upwardly within said openings of the upper support, said reduced portions carrying radial lugs spaced from the shoulders and adapted to enter said radial extensions and engage upon the upper surface of the upper support, and means to move the supports toward and away from each other.

2. In a baking device, upper and lower supports having corresponding ends hinged together, said supports having circular openings provided at their peripheries with radial extensions, female circular molds adapted for insertion in a downwardly direction through the openings in the lower support and provided at their tops with annular flanges to engage the upper surface of the lower support, said flanges being sharpened for providing cutting edges, said molds having radial lugs spaced from the flanges to pass through said radial extensions and engage the lower surface of the lower support, male circular molds secured to the upper support, and handles carried by the rear ends of the supports.

3. In a baking device, upper and lower supports having corresponding ends hinged together, said supports having circular openings provided at their peripheries with radial extensions, female circular molds adapted for insertion in a downwardly direction through the openings in the lower support and provided at their tops with annular flanges to engage the upper surface of the lower support, said flanges being sharpened for providing cutting edges, said molds having radial lugs spaced from the flanges to pass through said radial extensions and engage the lower surface of the upper support, male molds held within the openings of the upper support, an upper handle secured to the upper support and having a transverse opening, a lower handle secured to the lower support, and a latch pivoted to the lower handle and extending transversely through the transverse opening and having a shoulder to engage above the upper handle.

In testimony whereof I affix my signature.

JOHN A. CRESSEY.